United States Patent Office 2,929,677
Patented Mar. 22, 1960

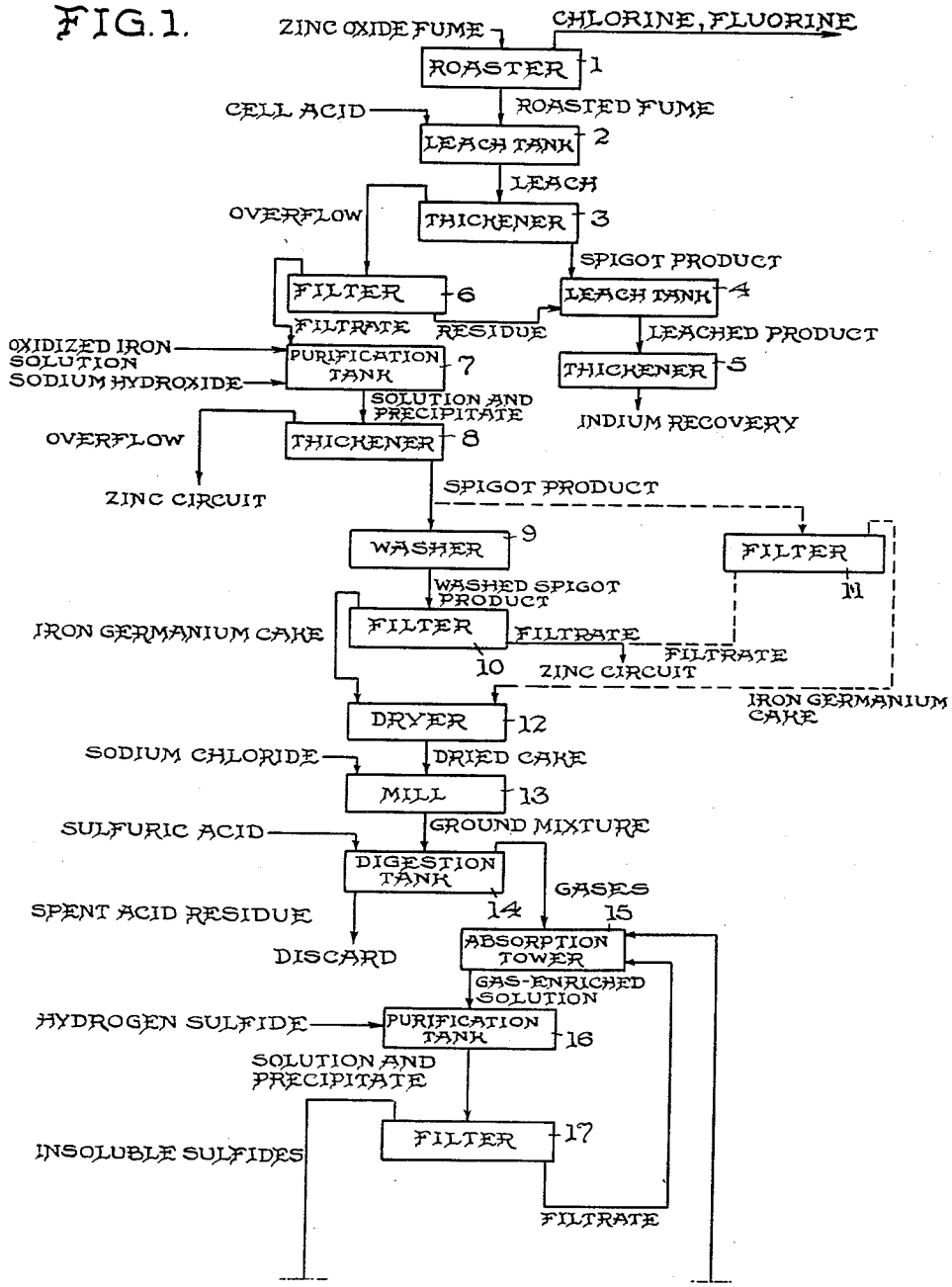

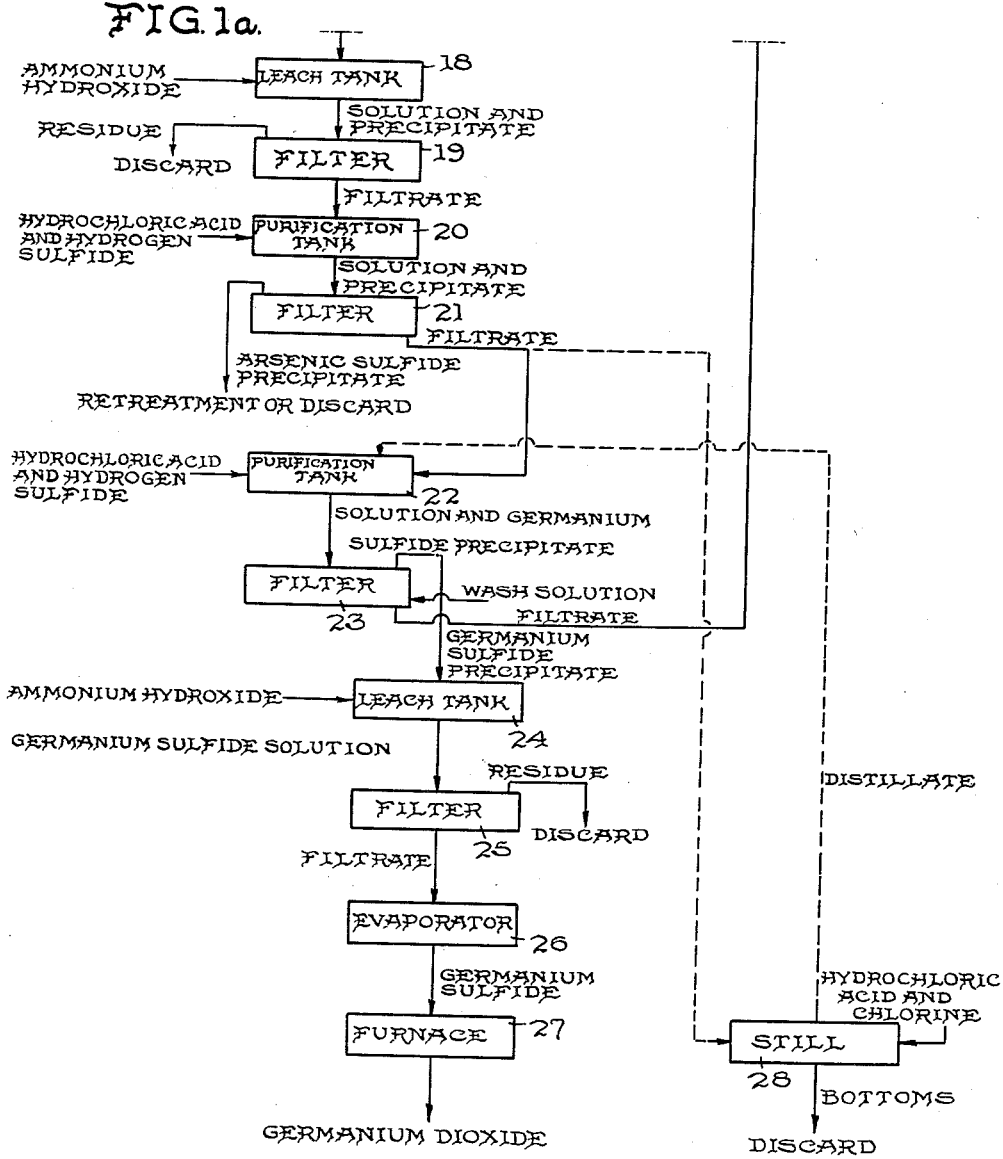

2,929,677
PROCESS FOR GERMANIUM RECOVERY

Alfred Immanuel Alf and Charles Ewalt Taylor, Great Falls, Mont., assignors to The Anaconda Company, a corporation of Montana Application November 24, 1954, Serial No. 470,872

6 Claims. (Cl. 23—18)

This invention relates to a process for the recovery of germanium and more particularly to a process for the recovery of germanium dioxide from materials containing germanium in impure form, such as zinc oxide fume recovered from lead blast furnace slag.

Germanium is present in most zinc sulphide concentrates in varying small quantities. In the treatment of the concentrates in an electrolytic zinc process, most of the germanium is removed from the zinc circuit in the neutral leach step where the roasted concentrates, or calcine, are leached. The precipitated germanium leaves the zinc circuit in the lead-iron residue. This residue is treated in a lead smelter wherein part of the germanium contained in the residue passes into the lead blast furnace slag. When this lead blast furnace slag is treated in a zinc slag fuming furnace, a high percentage of the zinc in the slag is recovered as a zinc oxide fume. This fume contains a portion of the germanium present in the lead blast furnace slag and constitutes a suitable starting material for the process of this invention.

In general the process of this invention comprises leaching the zinc oxide fume, precipitating germanium dioxide from the leach as an iron-germanium precipitate, and then converting the germanium dioxide into a volatile chloride by the action of hydrogen chloride at an elevated temperature. The hydrogen chloride preferably is formed by the action of sulfuric acid upon sodium chloride which is previously ground with the iron-germanium precipitate. The germanium tetrachloride is treated with hydrogen sulfide to precipitate germanium sulfide which is subsequently purified and ignited to the oxide.

More specifically the process comprises roasting the zinc oxide fume to eliminate chlorine and fluorine and to oxidize any constituents in the fume that would reduce ferric iron subsequently employed in the process. The roasted fume is leached with spent acid electrolyte from the zinc electrolyzing cells as a solvent to dissolve the germanium oxide present in the roasted fume. After the removal of solids, oxidized iron solution and then an aqueous solution of sodium hydroxide are added to the fume leach solution to precipitate the iron and germanium. The iron-germanium precipitate is dried and ground with sodium chloride followed by digestion of the mixture with sulphuric acid to generate hydrochloric acid and volatilize the germanium as germanium tetrachloride. The volatilized germanium tetrachloride, hydrogen chloride, and other evolved gases, such as chlorides of arsenic and antimony, are absorbed in water. Germanium and arsenic are separated from the gas-enriched solution as insoluble sulphides by the action of hydrogen sulphide. The arsenic and germanium sulphides are dissolved in an ammonia leach solution and the ammoniacal solution is acidified and treated with hydrogen sulphide to precipitate the arsenic. The germanium filtrate is further acidified and treated with hydrogen sulphide to precipitate germanium sulphide which is converted to the dioxide upon ignition.

The process will be further described in connection with the accompanying flow sheet shown in Figs. 1 and 1A which depicts the various steps in the recovery of germanium in purified form from a starting material containing other constituents which, from the standpoint of the germanium oxide, may be considered as impurities.

The process will be specifically described in connection with the recovery of germanium oxide in purified form from zinc oxide fume, as a starting material, but it is to be understood that other appropriate starting materials containing germanium in impure form might be used.

The zinc fume recovered from lead blast furnace slag is roasted in a Wedge roaster 1 to eliminate chlorine and fluorine and to oxidize any constituents in the fume that would reduce ferric iron subsequently employed in the process. The roasted fume is transferred to a series of leach tanks 2 of the Pachuca type where it is leached with spent acid electrolyte from the zinc electrolyzing cells as a solvent to dissolve the germanium present in the roasted fume. The acidity of the leach liquor may be as high as five grams per liter of sulphuric acid. The leach is discharged into a Dorr thickener 3, the overflow from which contains the leached germanium. The spigot product from the Dorr thickener 3 may be passed through leach tanks 4 and Dorr thickener 5 and further processed for the recovery of indium.

The overflow from the Dorr thickener 3 may be clarified in two ways, such as by settlement in a series of Dorr thickeners or by filtration. In order to attain the maximum concentration of germanium in the iron-germanium precipitate formed in a subsequent step of the process, it is desirable to have a solution as free of solids as possible. Therefore, filtration of the thickener overflow in filter 6 is the preferred method of clarifying the fume leach solution.

The residue from filter 6 is transferred to leach tanks 4 for leaching and subsequent recovery of indium. The fume leach solution or filtrate is transferred to purification tanks 7 where a clarified oxidized iron solution (i.e. an aqueous solution of a ferric salt such as ferric sulphate) is added thereto to increase the iron content to about 0.5 gram per liter. More than this amount of iron reduces the percentage germanium content in the subsequent iron-germanium precipitate, while less than about this amount results in only partial elimination of the germanium in the precipitation step. The acid in the solution is then neutralized and an iron-germanium precipitate obtained by the slow addition of an aqueous solution of sodium hydroxide. When the pH of the solution has been raised to about 5.2, the precipitation is complete. The solution and precipitate are then discharged to a Dorr thickener 8 for settlement of the solids.

The overflow from the Dorr thickener 8 is returned to the zinc circuit. The spigot product containing the iron-germanium precipitate is washed twice with water in wash tanks 9 to reduce any zinc sulfate present to a minimum and then filtered through a filter press 10. Alternatively, the spigot product may be filtered directly without washing in filter press 11, but such a procedure results in some zinc loss. The filtrate from filter press 11 also is returned to the zinc circuit.

The iron-germanium filter cake has a very high moisture content running between sixty-five percent and seventy-five percent after leaving the filter press 10 or 11. Therefore, it should be dried in order that the largest amount of material can be treated at one time. A steam table may be used as the dryer 12 and while use of such a table is not the most rapid method of drying, it enables dusting to be held to a minimum.

After the iron-germanium cake is dried, it is ground together with an approximately equal amount of coarse sodium chloride in a suitable mill 13, such as a number two Hance Drug Mill. Then the ground mixture is transferred to a digestion tank 14 containing commercial grade sulphuric acid.

In the digestion tank 14 the sulphuric acid reacts with the sodium chloride in the ground mixture to generate hydrogen chloride gas which in turn reacts with the germanium present in the mixture to form volatile germanium tetrachloride in accordance with the following equations:

$$H_2SO_4 + 2NaCl = 2HCl + Na_2SO_4$$
$$GeO_2 + 4HCl = GeCl_4 + 2H_2O$$

Any hydrogen chloride which does not react with the germanium oxide and the germanium tetrachloride are passed into a suitable absorption tower 15, such as one made of a ten foot length of two inch plastic pipe filled with finely woven plastic balls, and containing water as a suitable absorbing medium. The water is acidified by the hydrogen chloride and absorbs the germanium tetrachloride to form a rich germanium solution. The acidified solution prevents hydrolysis of germanium tetrachloride to germanium dioxide within the tower.

The digestion is carried out under a vacuum at a temperature from about 70° C. to 100° C. and preferably from about 90° C. to 100° C. The heat may be furnished by the direct addition of steam to the reactants in the digestion tank or otherwise. The acid-cake mixture is constantly and rapidly agitated to prevent solidification of the mass. Foaming, which is evident between about 60° C. to 65° C. may be controlled by the addition of a saturated soap solution to the acid-cake mixture. Since the germanium tetrachloride gas will escape from the absorption tower 15 when the temperature within the tower rises above about 35° C., the temperature of the tower may be controlled effectively and kept below 35° C. by placing a water-cooled condenser in the circuit between the digestion tank and the absorption tower. While the condensate from the condenser separates out a large amount of arsenic and some hydrogen chloride from the evolved gases, practically all of the germanium tetrachloride passes through the condenser to the absorption tower.

When a dry salt-cake mixture is digested, one gallon of commercial grade sulfuric acid is sufficient for about 4.4 pounds of the mixture or about one gallon of acid per two pounds of the dry iron-germanium filter cake.

The digestion of the mixture and evolution of germanium tetrachloride is complete after about five and one half hours running time, whereupon the spent acid residue of the digestion step is discarded.

Table I showing the operating conditions for a number of batches run through the digestion tank 14 and absorption tower 15 is presented below.

| Batch No. | Gallons Comm. H₂SO₄ | Pounds Fe-Ge Residue | Pounds NaCl | Temp., °C. | Operating Time, Hrs. |
|---|---|---|---|---|---|
| 1 | 12 | 14.5 | 14.5 | 80 | 6'—0" |
| 2 | 9 | 10.0 | 10.0 | 90 | 4'—0" |
| 3 | 7 | 8.0 | 8.0 | 100 | 4'—30" |
| 4 | 15 | 31.0 | 31.0 | 70 | 6'—0" |
| 5 | 15 | 30.0 | 30.0 | 90-100 | 6'—0" |
| 6 | 12 | 30.0 | 30.0 | 90-100 | 6'—0" |
| 7 | 11 | 19.1 | 33.5 | 90-100 | 6'—0" |
| 8 | 9 | 10.0 | 12.5 | 80-90 | 6'—0" |
| 9 | 12 | 15.0 | 15.0 | 80-85 | 6'—0" |
| 10 | 12 | 21.5 | 21.5 | 100-110 | 5'—0" |
| 11 | 6 | 15.0 | 15.0 | 90-100 | 6'—0" |
| 12 | 6 | 15.0 | 15.0 | 90-100 | 5'—30" |
| 13 | 12 | 23.0 | 23.0 | 90-100 | 4'—30" |
| 14 | 12 | 40.0 | 40.0 | 90-100 | 6'—30" |
| 15 | 12 | 40.0 | 40.0 | 90-100 | 5'—30" |
| 16 | 6 | 19.0 | 19.0 | 90-100 | 5'—30" |
| 17 | 12 | 31.0 | 35.5 | 90-100 | 5'—45" |
| 18 | 12 | 30.5 | 36.5 | 90-100 | 4'—30" |
| 19 | 6 | 15.0 | 15.0 | 90-100 | 5'—0" |
| Total | 198 | 417.6 | 445.0 | | |

The gas enriched solution from the absorption tower 15 is discharged into a suitable purification tank 16 after the digestion is complete and treated with hydrogen sulfide gas. The hydrogen chloride absorbed by the solution in the absorption tower 15 raises the acidity thereof sufficiently so that the hydrogen sulfide causes precipitation of germanium and arsenic sulfides. The solution and precipitate are transferred to filter 17 where the insoluble sulfides are filtered off and the filtrate is returned to the absorption tower 15. The sulfides are transferred to a leach tank 18 and dissolved in ammonium hydroxide. The ammoniacal solution is filtered in filter 19. The residue from the filtration is discarded and the filtrate is transferred to a purification tank 20 and made slightly acid with hydrochloric acid and treated with hydrogen sulfide for the removal of essentially all of the arsenic, which is precipitated as arensic sulfide at a low acidity, whereas the germanium sulfide in soluble at a low acidity. The arensic sulfide is filtered from the solution in filter 21 and retreated or discarded.

The germanium sulfide filtrate is transferred to a purification tank 22 and acidified with hydrochloric acid to approximately thirty percent acid content, treated with hydrogen sulfide to reprecipitate germanium sul-

| Batch | Fe-Ge Residue | | | GeO₂ Recovered | | | |
|---|---|---|---|---|---|---|---|
| | Dry Weight, Pounds | Percent Ge | Pounds Ge | Grams | Pounds | Equivalent Pounds Ge | Percent Ge Recovery |
| 1 | 14.5 | .19 | .02755 | 13.8 | .03039 | .02109 | 76.6 |
| 2 | 10.0 | .19 | .01900 | 12.0 | .02643 | .01834 | 96.5 |
| 3 | 8.0 | .19 | .01520 | 9.0 | .01982 | .01375 | 90.4 |
| 4 | 31.0 | .18 | .05580 | 35.6 | .07841 | .05442 | 97.5 |
| 5 | 30.0 | .18 | .05400 | 27.4 | .06035 | .04188 | 77.6 |
| 6 | 30.0 | .18 | .05400 | 26.8 | .05903 | .04097 | 75.9 |
| 7 | 19.1 | .18 | .03438 | 19.2 | .04223 | .02931 | 85.3 |
| 8 | 10.0 | .18 | .01800 | 8.4 | .01850 | .01284 | 71.3 |
| 9 | 15.0 | .18 | .02700 | 14.1 | .03106 | .02155 | 79.8 |
| 10 | 21.5 | .18 | .03870 | 20.5 | .04515 | .03133 | 81.0 |
| 11 | 15.0 | .17 | .02550 | 11.6 | .02555 | .01773 | 69.5 |
| 12 | 15.0 | .17 | .02550 | 11.5 | .02533 | .01758 | 68.9 |
| 13 | 23.0 | .17 | .03910 | 21.7 | .04780 | .03317 | 84.8 |
| 14 | 40.0 | .17 | .06800 | 27.8 | .06123 | .04249 | 62.5 |
| 15 | 40.0 | .23 | .09200 | 45.1 | .09934 | .06894 | 74.9 |
| 16 | 19.0 | .23 | .04370 | 23.1 | .05088 | .03531 | 80.8 |
| 17 | 31.0 | .27 | .08370 | 36.3 | .07995 | .05548 | 66.3 |
| 18 | 30.5 | .27 | .08235 | 50.8 | .11189 | .07765 | 94.3 |
| 19 | 15.0 | .27 | .04050 | 20.4 | .04493 | .03118 | 77.0 |
| Total | 417.6 | .202 | .84398 | 435.2 | .95827 | .66501 | 78.8 | fide, and the solution filtered in filter 23. The filtrate is returned to the absorption tower 15 and the germanium sulfide washed with 1 to 5 normal sulfuric acid saturated with hydrogen sulfide. The effluent wash solution may be used in the optional distillation steps described below. The washed germanium sulfide is dissolved in ammonium hydroxide in leach tank 24 and the residue filtered off in filter 25 and discarded. The solution is evaporated to dryness in evaporator 26.

When the sulfuric acid present from the wash solution begins to fume, nitric acid is added a little at a time until all carbonaceous material is oxidized. The dried germanium sulfide residue is transferred to a furnace 27 and ignited to produce germanium dioxide, the finished product of the process. In one series of batches of iron-germanium filter cake treated as described above an average recovery of 78.8 percent of the germanium present was obtained, with the recovery from individual batches ranging from a low of about 62.5 percent to a high of about 97.5 percent. These recovery rates are illustrated by the data in Table II above wherein the analyses of the batches in Table I are presented.

If an arsenic-free germanium dioxide is desired, the germanium sulfide filtrate from filter 21 may be transferred to still 28, acidified to thirty percent acid content with hydrochloric acid, and distilled directly with chlorine gas. The distillate may then be transferred to tank 22 and treated as described above to give an arsenic-free germanium dioxide. The bottoms from the still 28 are discarded.

While the process of the invention has been described in detail above in connection with zinc oxide fume, it will be understood that modifications may be made therein without departing from the spirit of the invention nor sacrificing any of the advantages thereof. The invention is to be limited only by the scope of the appended claims.

We claim:

1. A process for the recovery of germanium dioxide from a zinciferous oxidized raw material containing only a very small concentration of germanium values which comprises leaching said raw material with sulfuric acid, adding to the leach solution an aqueous solution of a ferric salt and a sodium hydroxide solution to precipitate iron and germanium compounds, filtering the iron-germanium precipitate from the zinc-containing solution, grinding the iron-germanium precipitate with sodium chloride, digesting the mixture produced thereby with sulfuric acid to form gaseous hydrogen chloride and to concurrently volatilize germanium tetrachloride, absorbing the germanium tetrachloride in an aqueous hydrochloric acid solution, adding hydrogen sulfide to the germanium tetrachloride solution to precipitate germanium sulfide, and igniting the germanium sulfide to germanium dioxide.

2. The process of claim 1 in which the sodium hydroxide solution is slowly added to the leach solution until the pH thereof has been raised to about 5.2

3. A process for the recovery of germanium dioxide from zinc oxide fume containing germanium values in low concentration which comprises roasting the zinc oxide fume, leaching the roasted fume with spent electrolyte from zinc electrolyzing cells containing sulfuric acid, filtering the fume leach solution, adding an aqueous solution of a ferric salt to the fume leach solution until the iron content thereof is about 0.5 gram per liter and then slowly adding a sodium hydroxide solution thereto to precipitate iron and germanium compounds, filtering and drying the iron-germanium precipitate and grinding it together with an approximately equal amount of sodium chloride, digesting the mixture produced thereby in sulfuric acid while heating to about 90° C. to 100° C. under a vacuum and agitating to volatilize germanium tetrachloride, absorbing the germanium tetrachloride in an aqueous hydrochloric acid solution maintained at a temperature below about 35° C., adding hydrogen sulfide to the germanium tetrachloride solution to precipitate germanium sulfide, and igniting the germanium sulfide to the germanium dioxide.

4. A process for the recovery of germanium dioxide from arsenical zinc oxide fume containing germanium values in low concentration which comprises roasting the zinc oxide fume, leaching the roasted fume with spent electrolyte from zinc electrolyzing cells containing sulfuric acid, filtering the fume leach solution, adding an aqueous solution of a ferric salt to the fume leach solution until the iron content thereof is about 0.5 gram per liter and then slowly adding a sodium hydroxide solution thereto to precipitate iron, arsenic and germanium compounds, filtering and drying the iron-arsenic-germanium precipitate and grinding it together with an approximately equal amount of sodium chloride, digesting the mixture produced thereby in sulfuric acid while heating under a vacuum to about 90° C. to 100° C. and agitating to volatilize chlorides of arsenic and germanium, absorbing the germanium tetrachloride and at least a portion of the arsenic chloride in an aqueous hydrochloric acid solution maintained at a temperature below about 35° C., adding hydrogen sulfide to the resulting solution to precipitate germanium and arsenic sulfides, leaching the sulfides with ammonium hydroxide, rendering the leached solution slightly acid with hydrochloric acid and incorporating hydrogen sulfide therein to precipitate arsenic sulfide, filtering off the precipitate from the residual germanium-containing solution, then rendering such solution strongly acidic by adding more hydrochloric acid thereto and incorporating hydrogen sulfide to precipitate germanium sulfide, dissolving the germanium sulfide in ammonium hydroxide and evaporating the solution to dryness, and igniting the dry residue to germanium dioxide.

5. A process for the recovery of germanium values from a raw material containing germanium values in low concentration which comprises roasting said material to insure substantially complete oxidation thereof, leaching the resulting oxidized roasted material with an aqueous sulfuric acid solution to dissolve the germanium values, incorporating a ferric salt in the resulting solution and rendering the solution alkaline with sodium hydroxide to form a precipitate of iron and germanium compounds, and recovering the germanium values from said precipitate.

6. A process for the recovery of germanium values from a raw material containing germanium values in low concentration which comprises roasting said material to insure substantially complete oxidation thereof, leaching the resulting roasted material with an aqueous sulfuric acid solution to dissolve the germanium values, incorporating a ferric salt in the resulting solution and rendering the solution alkaline with sodium hydroxide to form a precipitate of iron and germanium compounds, heating the resulting precipitate to a temperature of about 70° C. to about 100° C. in the presence of hydrogen chloride to distill germanium tetrachloride therefrom, absorbing the distilled germanium tetrachloride in an aqueous liquid, maintaining said solution acidic with hydrochloric acid to prevent hydrolysis of the absorbed germanium tetrachloride and maintaining said solution at a temperature below about 35° C. throughout the absorption operation, whereby escape of the volatile germanium tetrachloride from the acidic absorbent solution is substantially completely prevented, and recovering the germanium values from the resulting acidic solution of germanium tetrachloride.

References Cited in the file of this patent
UNITED STATES PATENTS 1,848,264    Mitchell  ---------------- Mar. 8, 1932

(Other references on following page)

OTHER REFERENCES

Mellor: "Comprehensive Treatise on Inorganic and Theoretical Chemistry," vol. 7, 1927, pages 261 and 270; vol. 2, page 162 (1922); vol. 7, 1927, pages 256, 257, 265 and 266.

Powell et al.: "The Extraction and Refining of Germanium and Gallium," in "Journal of Applied Chemistry," vol. 1, No. 12, December 1951, pages 541 to 551.

Thompson et al.: "Germanium, Produced as a By-Product," in "Journal of Metals," November 1952, vol. 4, Issue 11, pages 1132 to 1137.